(12) United States Patent
Henshaw

(10) Patent No.: US 9,266,614 B2
(45) Date of Patent: Feb. 23, 2016

(54) PASSENGER SUITE SEATING ARRANGEMENT WITH MOVEABLE VIDEO MONITOR

(71) Applicant: B/E Aerospace, Inc., Wellington, FL (US)

(72) Inventor: Robert J. Henshaw, Newnan, GA (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/449,634

(22) Filed: Aug. 1, 2014

(65) Prior Publication Data

US 2014/0361585 A1  Dec. 11, 2014

Related U.S. Application Data

(63) Continuation-in-part of application No. 13/955,370, filed on Jul. 31, 2013.

(60) Provisional application No. 61/678,170, filed on Aug. 1, 2012.

(51) Int. Cl.
*B64D 11/06* (2006.01)
*B64D 11/00* (2006.01)
(Continued)

(52) U.S. Cl.
CPC ............... *B64D 11/06* (2013.01); *A47B 81/06* (2013.01); *B60N 2/01* (2013.01); *B60N 2/4256* (2013.01);
(Continued)

(58) Field of Classification Search
CPC .... B64D 11/06; B64D 11/00; B64D 11/0015; B64D 11/0605; B64D 11/00153; B64D 11/0606; B60N 2/01; B60N 2/4256; B60N 11/0015; A47B 81/06; A47B 83/02; A47B 5/006; A47B 83/001; A47B 87/00

USPC ................... 244/118.6; 297/174 R
See application file for complete search history.

(56) References Cited

U.S. PATENT DOCUMENTS 2,947,349 A * 8/1960 Kryter ........................ 297/174 R
6,059,364 A * 5/2000 Dryburgh et al. ........ 297/354.13
(Continued)

FOREIGN PATENT DOCUMENTS

WO        0021831 A2    4/2000
WO    2007072045 A2    6/2007
WO    2013142181 A1    9/2013

OTHER PUBLICATIONS

International Search Report for PCT/US2013/052881 Dated Dec. 2, 2013.

*Primary Examiner* — Tien Dinh
*Assistant Examiner* — Vicente Rodriguez
(74) *Attorney, Agent, or Firm* — Shumaker, Loop & Kendrick, LLP

(57) ABSTRACT

A passenger suite seating arrangement that includes first and second passenger suites positioned side-by-side and including respective first and second seats and first and second video monitors respectively positioned in a viewing position directly forward of the first seat and second seats. Third and fourth passenger suites are positioned side-by-side and facing the first and second passenger suites, and include respective third and fourth video monitors positioned and adapted to move between a stowed position laterally offset from a viewing position and a deployed viewing position forward of the third and fourth seats. In the deployed viewing position the third and fourth video monitors block visual contact between occupants of the first and second seats and the occupants of the third and fourth seats.

15 Claims, 10 Drawing Sheets

(51) Int. Cl.
  *B60N 3/00* (2006.01)
  *A47B 81/06* (2006.01)
  *B60N 2/01* (2006.01)
  *B60N 2/42* (2006.01)

(52) U.S. Cl.
  CPC ............ *B60N 3/002* (2013.01); *B64D 11/0015* (2013.01); *B64D 11/00153* (2014.12); *B64D 11/0601* (2014.12); *B64D 11/0605* (2014.12); *B64D 11/0606* (2014.12); *B64D 11/0638* (2014.12)

(56) References Cited

U.S. PATENT DOCUMENTS

| | | | |
|---|---|---|---|
| 7,178,871 B1* | 2/2007 | Round et al. | 297/244 |
| 7,419,214 B2* | 9/2008 | Plant | 297/245 |
| 8,573,537 B2* | 11/2013 | Bock | 244/118.6 |
| 2003/0218095 A1* | 11/2003 | Saint Jalmes | 244/118.5 |
| 2007/0262625 A1 | 11/2007 | Dryburgh et al. | |
| 2010/0187357 A1* | 7/2010 | Funke et al. | 244/118.6 |
| 2012/0104165 A1 | 5/2012 | Dobrusin et al. | |

* cited by examiner

PASSENGER SUITE SEATING ARRANGEMENT WITH MOVEABLE VIDEO MONITOR

CROSS-REFERENCE TO RELATED APPLICATION

This application is a continuation-in-part that claims priority to U.S. Provisional Application No. 61/678,170 filed Aug. 1, 2012, the contents of which are incorporated by reference herein, and to U.S. patent application Ser. No. 13/955,370, filed Jul. 21, 2013, the contents of which are incorporated by reference herein

TECHNICAL FIELD AND BACKGROUND OF THE INVENTION

The present invention relates generally to premium class aircraft passenger seating arrangements and seat privacy, and more particularly, to a seating arrangement including laterally adjacent columns of alternating fore and aft facing suites, wherein video monitors and partitions are moveable to selectively provide privacy between suites or to permit conferencing between laterally and longitudinally adjacent suites.

Premium passenger seating arrangements in aircraft can take the form of individual suites separated and defined by privacy walls and partitions. Such suites typically include a passenger living area outfitted with comfort, luxury and convenience features such as lie-flat adjustable seats, desks, advanced media and electronics, closets and various storage compartments, among other amenities.

With the development of passenger suites, there is a continuing effort to offer more and better features and amenities to passengers to further accommodate their needs and increase the level of luxury of such suites. There is also a continuing effort to arrange suites to maximize seating density in an aircraft, maximize the use of limited space in the suites, and maintain the perceived openness of the suites. While passengers have come to expect certain amenities, the inclusion of amenities comes with additional cost, weight, complexity and space requirements.

Therefore, to meet the expectations of passengers while maximizing the use of space and minimizing complexity, provided herein are novel passenger seating arrangements and amenity configurations wherein amenities are arranged to serve multiple functions.

BRIEF SUMMARY OF THE INVENTION

It is an object of the invention to provide a passenger suite seating arrangement that maximizes seating density and the use of space.

It is another object of the invention to provide a passenger suite seating arrangement that permits conferencing between passengers in laterally and longitudinally adjacent suites.

It is a further object of the invention to provide a passenger seating arrangement including suites that nest and share partition walls.

It is a further object of the invention to provide a passenger suite seating arrangement including one or more columns of alternating fore and aft facing suites.

It is a further object of the invention to provide suites having moveable partition walls that open to connect laterally adjacent suites.

It is a further object of the invention to provide suite amenities that serve multiple functions.

It is a further object of the invention to provide a video monitor configured to move left and right parallel to a passenger's viewing plane for privacy or to permit conferencing between passengers in adjacent suites.

It is a further object of the invention to provide a passenger suite seating arrangement including partitions and amenities configured to permit conferencing and line of sight between a passenger in a first suite, a second passenger in a second suite longitudinally adjacent the first suite, and third and fourth passengers in third and fourth suites.

To achieve the foregoing and other aspects and advantages, in one embodiment, A passenger suite seating arrangement is provided that includes first and second passenger suites positioned side-by-side and including respective first and second seats and first and second video monitors respectively positioned in a viewing position directly forward of the first seat and second seats. Third and fourth passenger suites are positioned side-by-side and facing the first and second passenger suites. Respective third and fourth video monitors are positioned and adapted to move between a stowed position laterally offset from a viewing position and a deployed viewing position forward of the third and fourth seats, wherein in the deployed viewing position the third and fourth video monitors block visual contact between occupants of the first and second seats and the occupants of the third and fourth seats.

According to another aspect of the invention, the third and fourth video monitors move between the stowed and deployed positions perpendicular to a viewing angle of a passenger seated in the respective third and fourth seats, and the first and second passenger suites share a desk positioned therebetween.

According to another aspect of the invention, the first and second seats are spaced apart by a lateral space that approximates a lateral space occupied by the third and fourth seats.

According to another aspect of the invention, first and second upright support structures are positioned in viewing position directly in front of the first and second seats and supporting the respective first and second video monitors.

According to another aspect of the invention, the first and second upright support structures include first and second cabinets that house the third and fourth video monitors in their respective stowed positions laterally offset from the viewing positions.

According to another aspect of the invention, a first partition wall having first and second spaced apart concavities is provided for containing the respective first and second seats in spaced-part relation to each other, and a second partition wall is provided having a single central concavity facing first partition wall and containing the third and fourth seats.

According to another aspect of the invention, the first and second partition walls have the same overall shape.

According to another aspect of the invention, each of the first, second, third and fourth passenger suites include a tray table deployable from a position directly forward and spaced apart from the respective seat to a position directly forward and over the respective seat.

According to another aspect of the invention, the first and second seats are lie-flat adjustable seats.

According to another aspect of the invention, the first and second passenger suites are divided by a shared console topped with a desk shared by the first and second passenger suites, the desk supports the first and second video monitors thereon.

According to another aspect of the invention, the first and second video monitors are fixed in their respective viewing positions.

According to another aspect of the invention, the partition walls positioned behind the first and second seats are sinusoidal shaped.

According to another aspect of the invention, a console is laterally positioned between the first and second seats and the third and fourth seats, and includes distally-positioned foot wells for use by occupants of respective first and second seats, and centrally-positioned foot wells for use by occupants of respective third and fourth seats.

According to another aspect of the invention, a passenger suite seating arrangement is provided that includes a first and second passenger suites positioned side-by-side, including respective first and second seats, and first and second video monitors respectively positioned in a viewing position directly forward of the first seat and second seats. Third and fourth passenger suites are positioned side-by-side facing the first and second passenger suites. The first and second seats are spaced apart by a lateral space that approximates a lateral space occupied by the third and fourth seats. Respective third and fourth video monitors are positioned and adapted to move between a stowed position laterally offset from a viewing position and a deployed viewing position forward of the third and fourth seats, wherein in the deployed viewing position the third and fourth video monitors block visual contact between occupants of the first and second seats and the occupants of the third and fourth seats, wherein the third and fourth video monitors move between the stowed and deployed positions perpendicular to a viewing angle of a passenger seated in the respective third and fourth seats, and wherein the first and second passenger suites share a desk positioned therebetween. A shared console topped with a desk is shared by the first and second passenger suites. The desk supports the first and second video monitors.

According to another aspect of the invention, first and second upright support structures are positioned in viewing position directly in front of the first and second seats and supporting the respective first and second video monitors.

According to another aspect of the invention, the first and second upright support structures include first and second cabinets that house the third and fourth video monitors in their respective stowed positions laterally offset from the viewing positions.

According to another aspect of the invention, a first partition wall having first and second spaced apart concavities is provided for containing the respective first and second seats in spaced-part relation to each other, and a second partition wall having a single central concavity facing first partition wall is provided and contains the third and fourth seats.

According to another aspect of the invention, the first and second partition walls have the same overall shape.

According to another aspect of the invention, each of the first, second, third and fourth passenger suites include a tray table deployable from a position directly forward and spaced apart from the respective seat to a position directly forward and over the respective seat.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
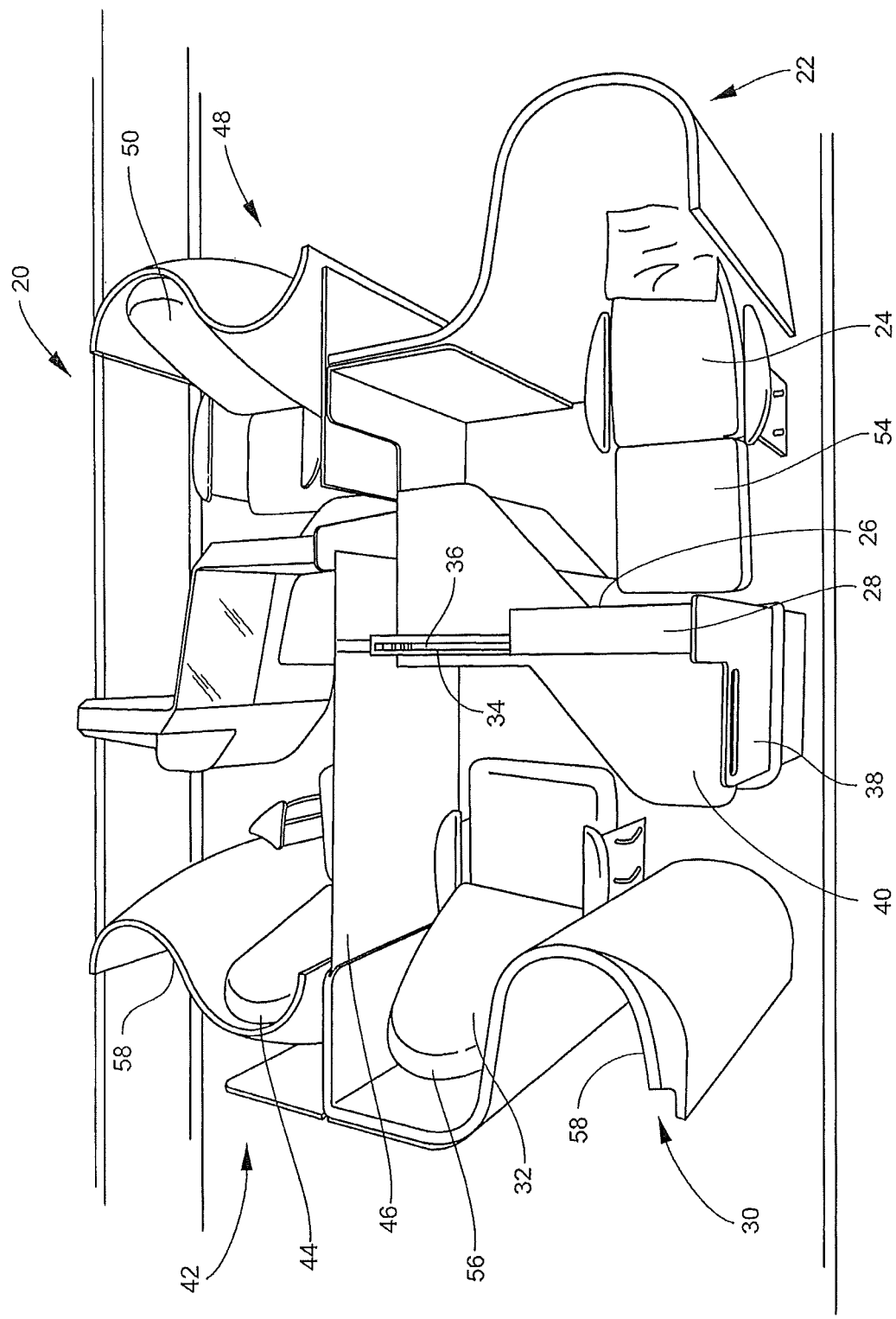
FIG. 1 is an overhead perspective view of a passenger suite seating arrangement according to an embodiment of the invention.
Figure 2:
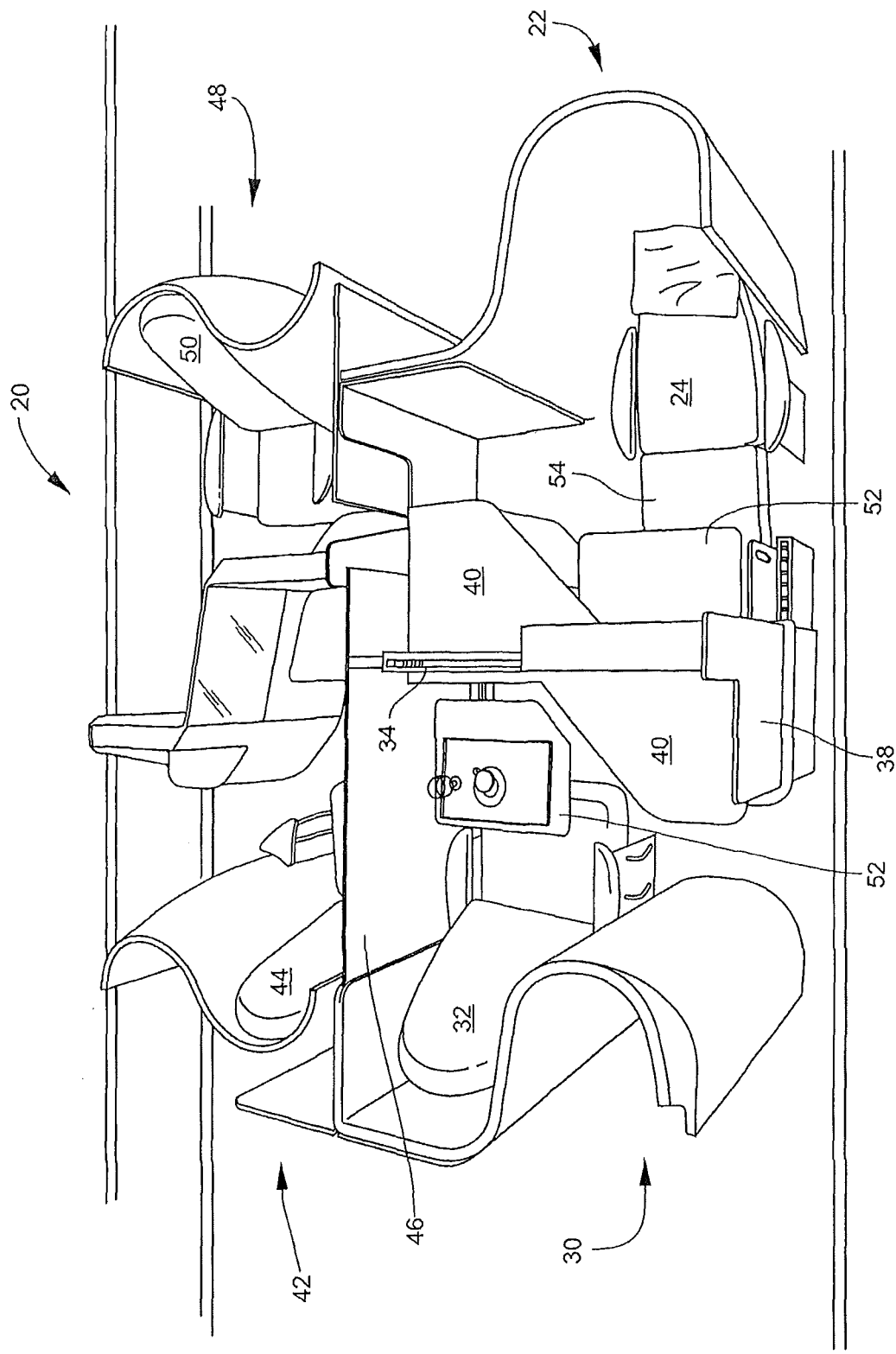
FIG. 2 is another overhead perspective view of the seating arrangement showing seat adjustability and deployable tray tables.
Figure 3:
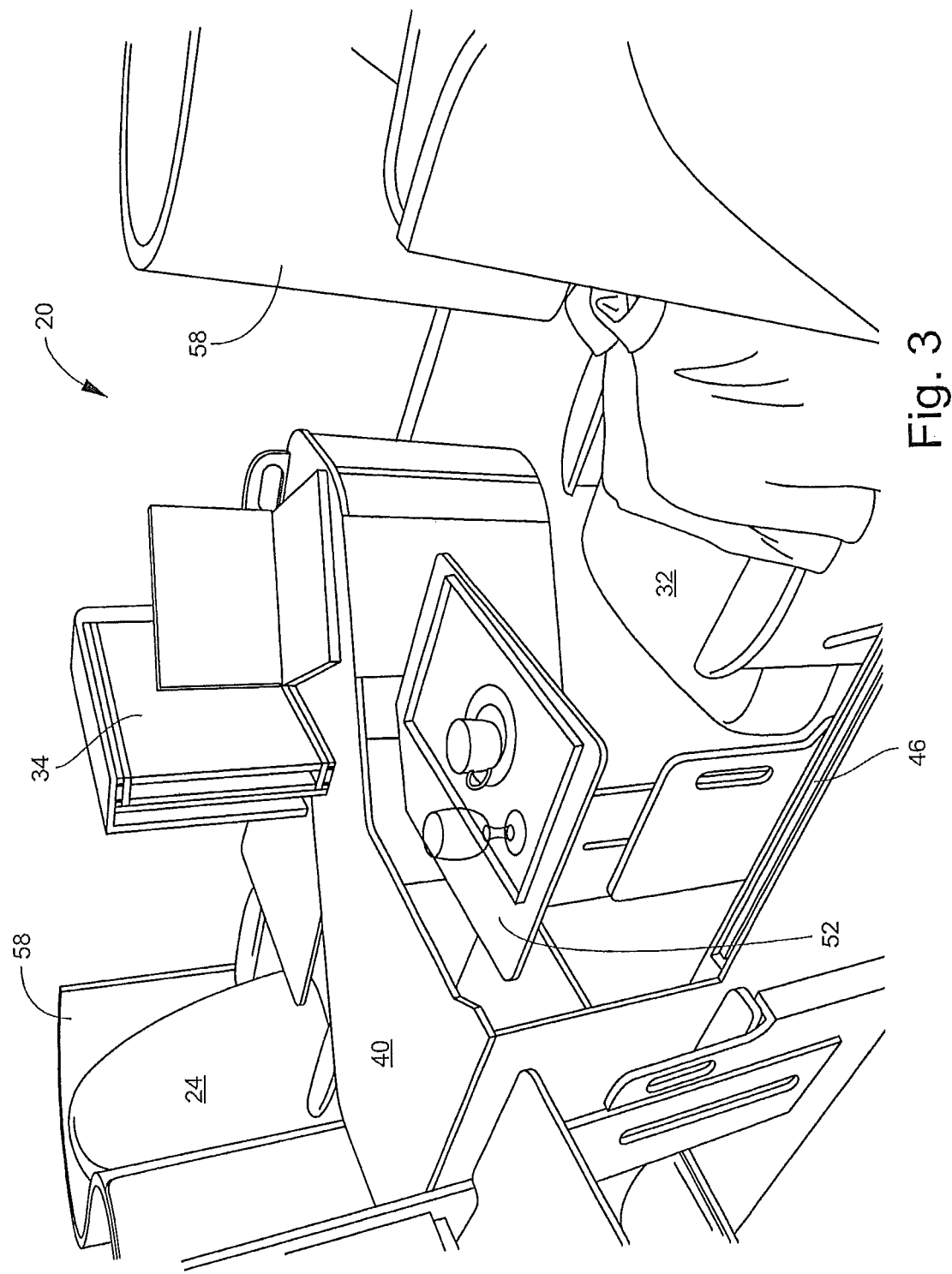
FIG. 3 is a perspective view of longitudinally adjacent suites shown with the moveable video monitor in a stowed position to allow facing passengers to see one another and converse.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, provided herein are various embodiments of passenger suite seating arrangements, for example, for installation within an aircraft or other conveyance. The term "suite" as used herein includes individual passenger living compartments or living spaces generally including adjustable seats, working surfaces, tray tables, video equipment, etc. Each suite may have its own entrance accessible from an aisle. Suites are divided and separated by one or more of partitions, shared structures, privacy walls, etc. Directions and offsets are generally described herein with reference to the longitudinal axis of the aircraft or conveyance, wherein the "longitudinal direction" is intended to be along the length of the aircraft and the "lateral" direction is intended to be in the direction perpendicular to the longitudinal axis of the aircraft.

As shown throughout the figure, the suites are arranged with their length parallel to the longitudinal axis of the aircraft, and thus parallel to the aisles. The suites may have a longer length than width to accommodate the length of a lie-flat adjustable seat when fully reclined to form a horizontal bed surface. As shown, the seats within the suites are arranged with their longitudinal axis generally parallel to the longitudinal axis of the aircraft. Suites may be arranged in any group including any number of suites. For example, suites may be arranged end-to-end to form columns of alternating fore and aft facing suites. Columns may flanked on either side by aisles, by an aisle on one side and a column of similar or dissimilar suites on the other side, or by columns on both sides so long as an entrance to each suite is provided. Suites may have varying lengths and widths to accommodate the furniture and amenities provided therein. Suites may also have varying heights depending on the available air space and degree of privacy desired. Although each suite is shown including only a single adjustable suite, it is envisioned that suites may include more than one seat and sized and shaped accordingly.

Referring to FIGS. 1-6, an embodiment of a premium class passenger seating arrangement is shown generally at reference numeral 20. The seating arrangement generally includes a plurality of passenger suites arranged into columns and rows. The seating arrangement includes a first passenger suite 22 including a first seat 24 and a first video monitor 26 fixed in position directly forward of the first seat 24. The first video monitor 26 may be an in-flight entertainment monitor and may be housed within a cabinet 28 or mounted to a supporting structure, for example a vertical wall. The first video monitor 26 is positioned directly forward of the first seat 24 to position the monitor at the optimum viewing angle for a passenger seated in the first seat 24. The first video monitor 26 may function to display in-flight movies, shows, informational messages and may link with a communications device supplied by the passenger or airline carrier.

The first seat 24, as well as the other seats disclosed herein, may be a fully adjustable seat configured to move between an upright position for taxi, take-off and landing, and a lie-flat position forming a horizontal bed. The seats disclosed herein generally include a seat back, a seat pan, a legrest and left and right armrests. "Inboard" seats are defined herein as seats spaced from the aisle, for example positioned along the interior wall of the suite. "Outboard" seats are defined herein as seats positioned adjacent the aisle. A "fore" or "forward" facing seat as defined herein faces in the direction of the cockpit, while an "aft" facing seat faces in the direction of the tail. Seats may be required to be in their upright position to permit ingress/egress to and from the suite, particularly in the case of outboard seats.

The seating arrangement further includes a second passenger suite 30 including a second seat 32 facing the first seat 24 and laterally offset relative thereto along a longitudinal axis of the first and second suites. The first and second seats 24, 32 thus face each other but are laterally offset. The second suite 30 includes a second video monitor 34 configured to move to selectively connect and divide the first and second suites. In other words, the second video monitor 34 is moveable from a first position laterally offset relative to the second seat 32, to a second position directly forward of the second seat 32. In a specific configuration, the second video monitor 34 is configured to selectively move left and right generally parallel to a viewing angle of a passenger seated in the second seat 32.

Figure 4:
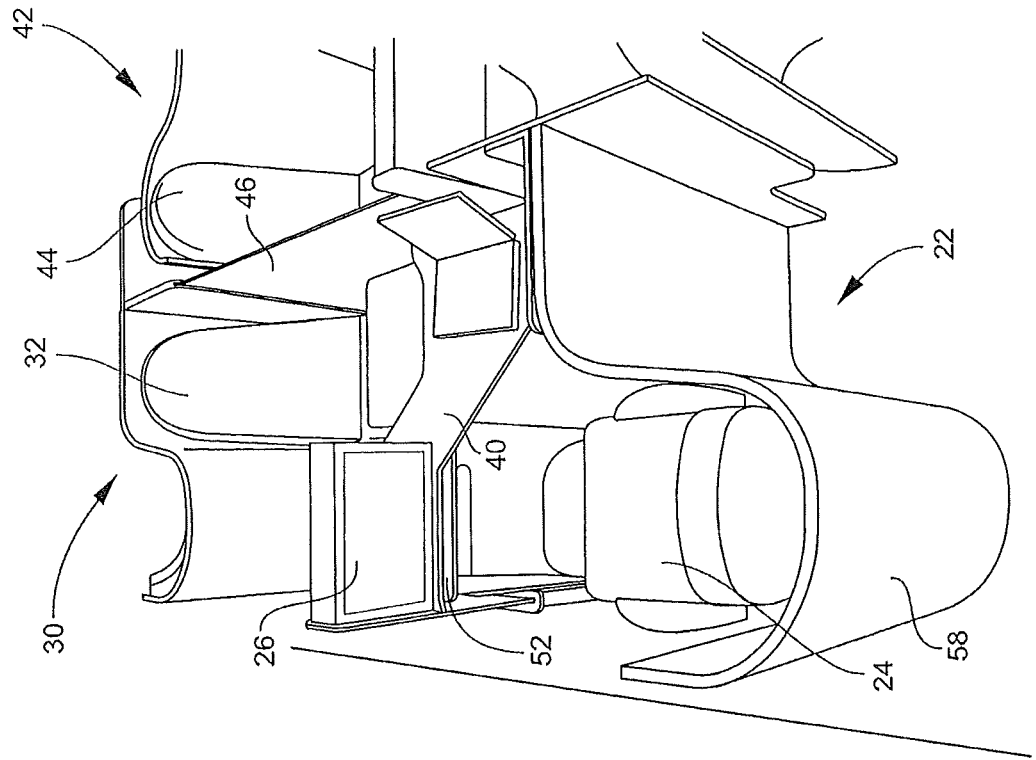
FIG. 4 is a front perspective view of a portion of a column of suites showing the moveable video monitor in a deployed position to block the opening between facing suites.
Figure 5:
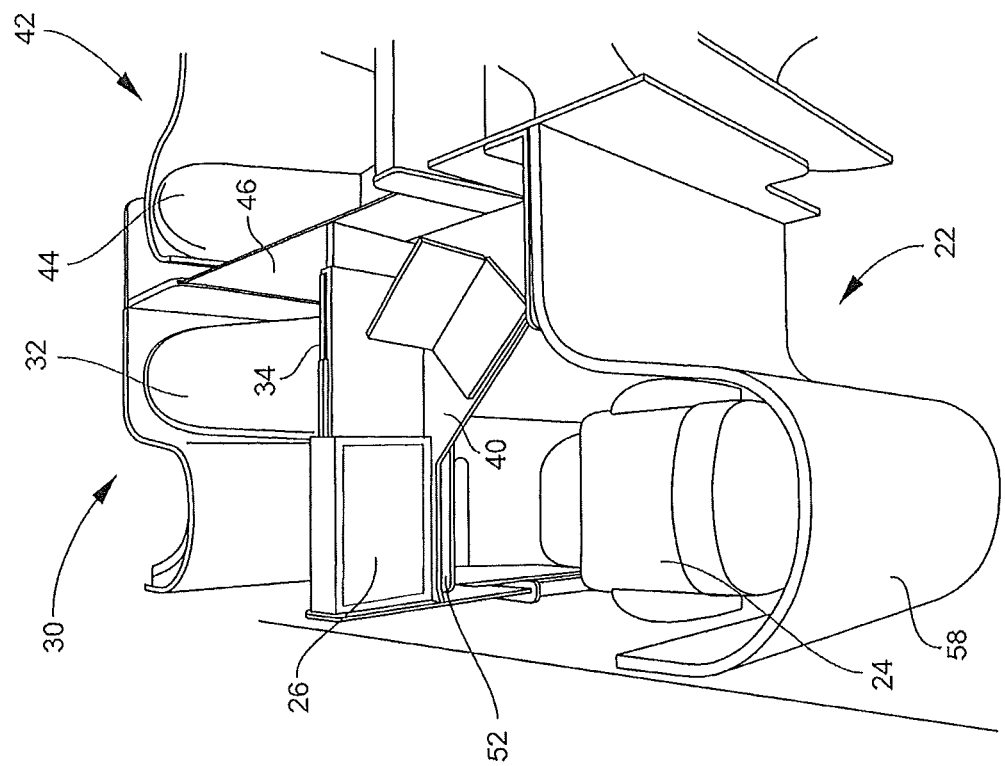
FIG. 5 is a front perspective view of a portion of a column of suites showing the moveable video monitor in a stowed position to allow facing passengers to see one another and converse.

As best shown by a comparison between FIGS. 4 and 5, when the second video monitor 34 is in the first or "right" or "stowed" position, the passengers seated in the first and second seats 24, 32 are able to see one another (i.e., have line of sight) and can communicate or conference. In other words, when the second video monitor 34 is laterally offset relative to the second seat 32, a space between the first and second suites 22, 30 above the desk is left open, thus "connecting" the suites. When the second video monitor 34 is in the second, left or deployed position directly forward of the second seat 32, the optimum viewing angle for the monitor is provided to the passenger seated in the second seat 32 and the space between the first and second suites 22, 30 is closed off or blocked. This divides the suites, provides privacy between the suites and divides the working surface upon which the monitors are supported.

The first video monitor 26 is fixed in position. The second video monitor 34 is configured to selectively move left and right. Movement may be by way of sliding, such as along a track. The track may be mounted to the top surface of the supporting desk. The monitor may alternatively be hung from a track or cantilevered as easily achieved by one skilled in the art. In a preferred embodiment, the cabinet 28 housing the first video monitor 26 carries a track at the top thereof from which the second video monitor 34 is hung. The second video monitor 34 is attached to a portion of a bearing slide 36, such as a linear ball-bearing slide, roller bearing slide or progressive action slide that allows the second video monitor 34 to be drawn out horizontally and selectively positioned. The bearing slide 36 may include a mechanism to prevent the second video monitor 34 from accidentally being moved in either direction.

The first and second passenger suites 22, 30 are divided and separated by a shared console 38 that supports the monitors, defines footwells, supports working surfaces, defines compartments, etc. A desk 40 is positioned atop the console 38 and provides a flat, horizontal working surface for eating, supporting a computer, writing, etc. The desk 40 may be shared by both the first and second suites 22, 30 and may extend into portions of both suites. Each suite 22, 30 may also include its own desk. The desk 40 may be divided by the second video monitor 34 when the second video monitor is positioned directly forward of the second seat 32.

The seating arrangement 20 further includes a third passenger suite 42 arranged laterally adjacent the second passenger suite 30. The third passenger suite 42 includes a third seat 44 positioned adjacent the second seat 32. The second and third seats 32, 44 both face in the same direction.

A moveable partition 46 is positioned between the second and third seats 32, 44. The partition 46 is configured to selectively move between a deployed position dividing the second and third passenger suites 30, 42 (see FIGS. 1 and 2), and a stowed position connecting the second and third passenger suites (see FIG. 6). The partition may raise and lower, or may slide to the left and right depending upon configuration of the partition, available space vertically below the partition, available space to either the left or right of the partition, among other factors.

Figure 6:
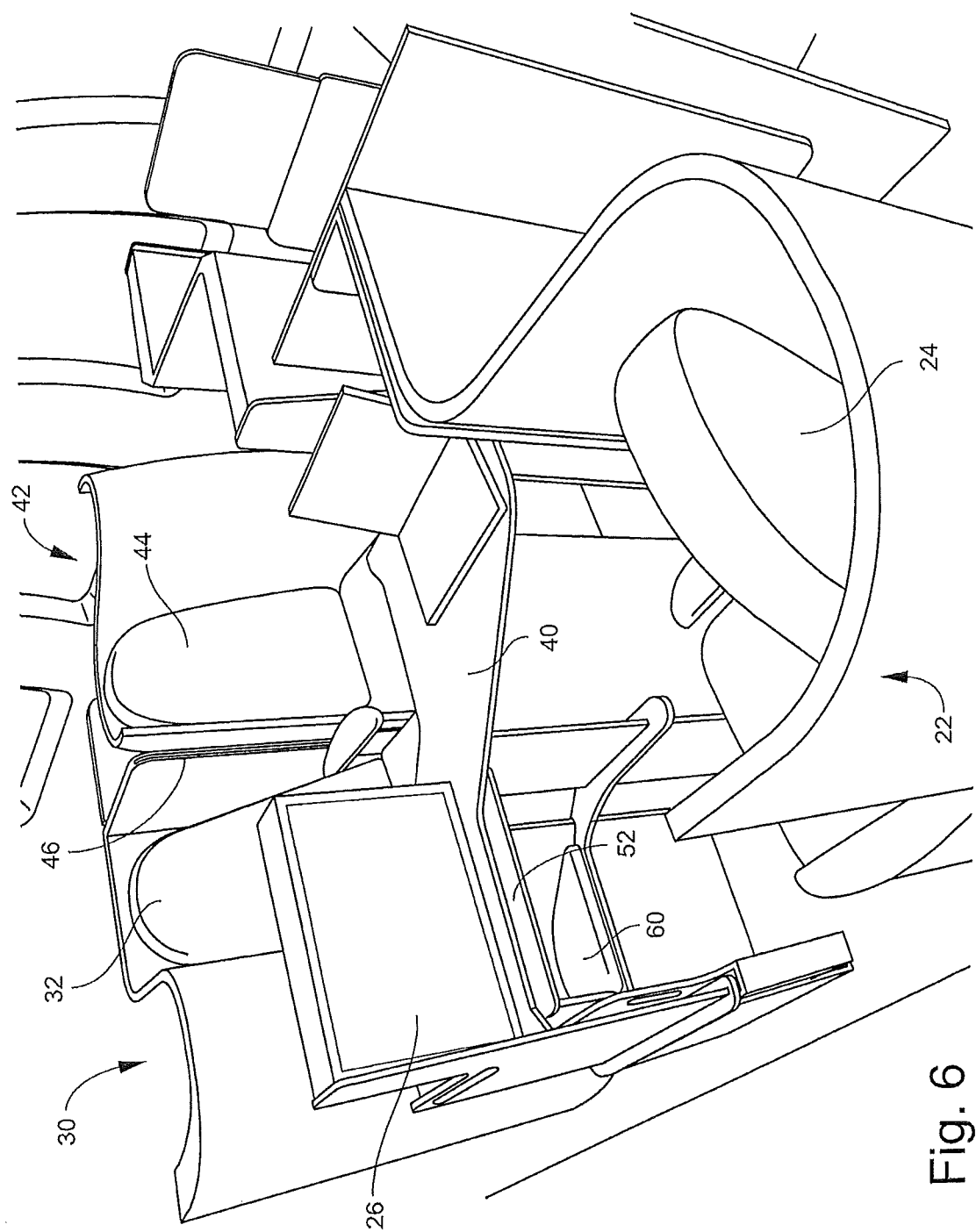
FIG. 6 is a perspective view of three adjacent suites showing the video monitor in a stowed position and the partition between laterally adjacent seats in a lowered position to open the suites to one another to allow passengers in the suites to communicate and see one another.

As best shown in FIG. 6, stowing the partition opens the space between the second and third suites 30, 42 and allows conferencing and line of sight between passengers seated in the second and third suites 30, 42. When both the second video monitor 34 and the partition 46 are stowed, it is possible for the passengers seated in the first, second and third suites 22, 30 and 42 to see each other and communicate. In other words, line of sight is provided between passengers seated in the first, second and third seats 24, 32 and 44 when the second video monitor 34 is positioned laterally offset relative to the second seat 32 and the partition 46 between the second and third seats is stowed. Thus, conferencing is not only permitted between suites within the same column, but between suites within adjacent columns. Working surfaces may also be shaped and configured so that they can be shared between the passengers. Actuating the movement of the second video monitor 34 and the partition 46 may be done manually or automatically through a controller located in a suite control panel.

In a further embodiment, the seating arrangement may include a fourth passenger suite 48 facing the third passenger suite 42 and laterally adjacent the first passenger suite 22. The fourth passenger suite 48 includes a fourth seat 50. The first and second passenger suites 22, 30 are arranged to form a first column and the third and fourth passenger suites 42, 48 are arranged to form a second column laterally adjacent the first column. The first and fourth seats 24, 50 are outboard seats adjacent the aisles, and the second and third seats 32, 44 are inboard seats spaced apart from the aisles.

One or more of the first, second, third and fourth suites 22, 30, 42, 48 may include a tray table 52 deployable from a first position directly forward and spaced apart from its respective seat, to a second position directly forward and over its respective seat. The tray table 52 may deploy from beneath the desk 40, and may stow beneath the desk to permit egress from the seat. The tray table 52 can be configured to slide forward and backward relative to the seat along a track positioned to the side of the seat in the console 38. The tray table 52 can be adjustable vertically as well for maximum adjustability.

The seats described herein are preferably lie-flat adjustable seats wherein legrests 54 of the first and second seats 24, 32 laterally overlap along the longitudinal axis of the first and second passenger suites 22, 30 when the first and second seats are both in a lie-flat configuration. When the first seat 24 is in the lie-flat configuration, the respective legrest 54 (or the feet of the seat occupant) may extend underneath the desk 40 of the second passenger suite 30. When the second seat 32 is in the lie-flat configuration, the respective legrest 54 (or the feet of the seat occupant) may extend beneath the desk of the first passenger suite 22.

The first and second video monitors 26, 34 and their respective cabinets, as well as the partition walls dividing the suites, preferably extend vertically above a height of the seat back 56 in the upright seating position to provide privacy between suites. The partition walls 58 positioned behind the seats may be sinusoidal shaped to accommodate the long length of a reclined seat and shorter length of the space adjacent the seat. The partition or "privacy walls" may be shared between suites or suites may each include their own walls depending on the suite arrangement and suite positioned within the cabin. FIG. 1 includes two different exemplary arrangements of suite walls, with the suite wall of suite 30 extending in the direction of suite 42. Suite 42 includes a suite wall that curves around the seat 44.

Further features may include a shelf 60 positioned within each footwell that functions as an ottoman, providing power and media connections and associated cabling in the console, lighting, etc. Cabling associated with the second video monitor 34 may be positioned to the side of the monitor adjacent the aisle, and can be managed to prevent tangling during sliding movement.

Referring now to FIGS. 7-11, a seating arrangement 70 is disclosed. Reference is made to the above description with reference to FIGS. 1-6, where it will be observed that the same seating components and structures are disclosed as are found in FIGS. 7-11. In FIGS. 7-11 four suites 80, 100, 120 and 140 are shown. Suite 80 includes a seat 82 and a video monitor 84 fixed in position directly forward of the seat 82. The video monitor 84 may be an in-flight entertainment monitor and may be housed within a cabinet 86 or mounted to a supporting structure, for example a vertical wall. The video monitor 84 is positioned directly forward of the first seat 82 to position the monitor 84 at the optimum viewing angle for a passenger seated in the seat 82.

The seat 82, as well as the other seats disclosed herein, may be a fully adjustable seat configured to move between an upright position for taxi, take-off and landing, and a lie-flat position forming a horizontal bed. The suite 80 also includes a table assembly 88, as more specifically described above, that provides a work/dining surface for the occupant of seat 82 with a foot well 90 beneath the table 88 for use by the occupant of seat 122.

The passenger suite 100 includes a seat 102 adjacent the seat 82 so that the passengers seated in seats 82 and 102 are seated side-by-side and separated by a partition wall 160. The suite 100 includes a video monitor 104 positioned directly forward of the seat 102, preferably housed in a cabinet 106. A table assembly 108 provides a work/dining surface for the occupant of seat 102 with a foot well 110 beneath the table 108 for use by the occupant of seat 142.

The video monitors 84 and 104 are fixed in their respective positions forward of the seats 82, 102, respectively.

Figure 10:
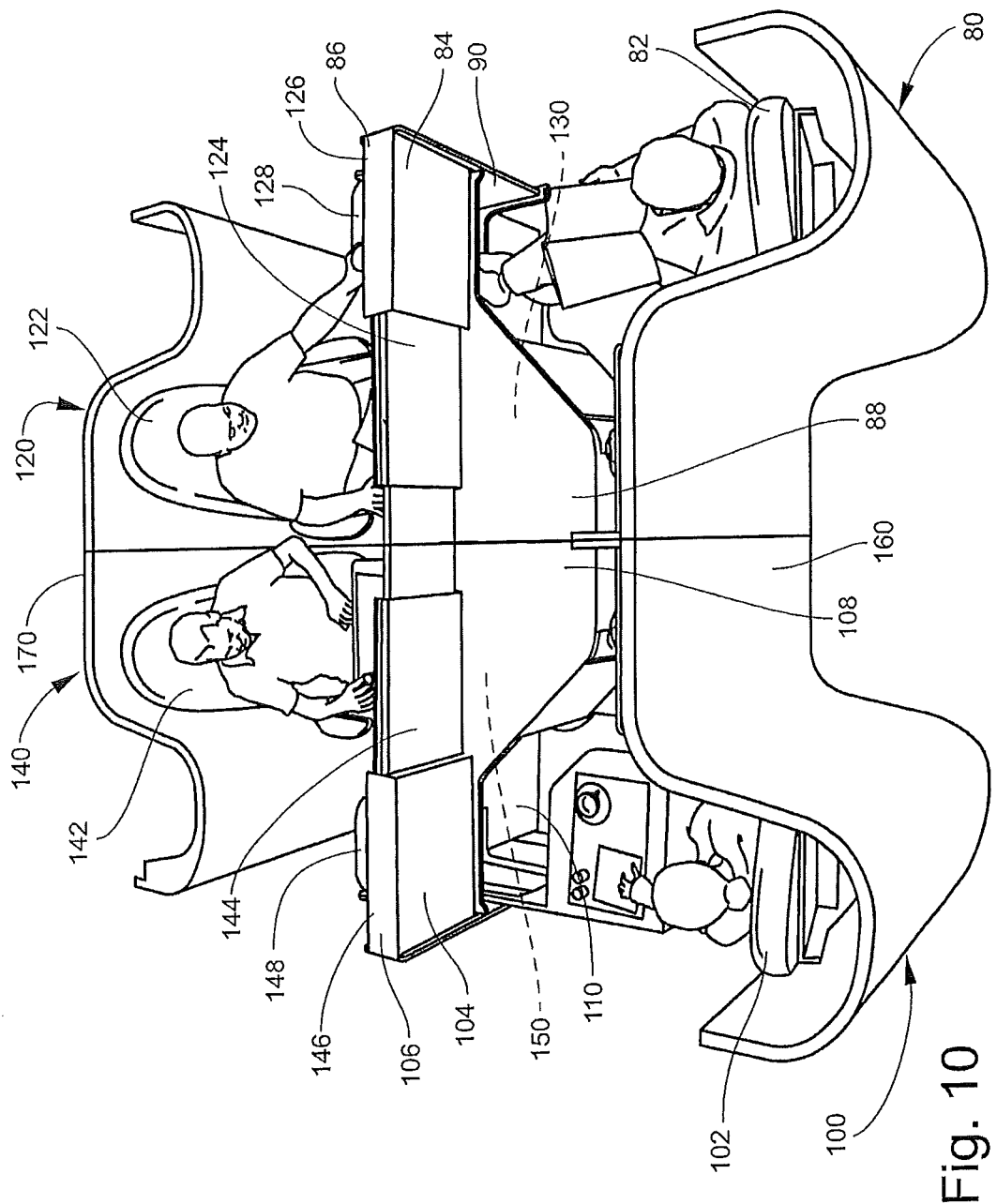
FIG. 10 is an overhead perspective view perpendicular to the view of FIG. 9 showing the seating configuration of FIG. 9.

The suites 120 and 140 configured whereby they are more closely positioned relative to each other. This is accomplished by positioning the seats 122, 142 in a partition wall 170, which is the same shape as the partition wall 160, but with the seats 122, 142 positioned on an opposite side in separate, spaced-apart concavities. The suite 120 includes a video monitor 124 that is housed in a cabinet 126, which may be part of or separate from the cabinet 84. The video monitor 124 is positioned, as described above, to slide between a stowed position in the cabinet 126 and a deployed position directly in front of the seat 122 as shown in FIG. 10. Suite 120 includes a table assembly 128 and a foot well 130 positioned under the table 88 of seat 82 for use by the occupant of seat 82.

The suite 140 includes a video monitor 144 that is housed in a cabinet 146, which may be part of or separate from the cabinet 106. The video monitor 144 is positioned, as described above, to slide between a stowed position in the cabinet 146 and a deployed position directly in front of the seat 142. Suite 140 includes a table assembly 148 and a foot well 150 positioned under the table 108 of seat 102 for use by the occupant of seat 102.

Figure 7:
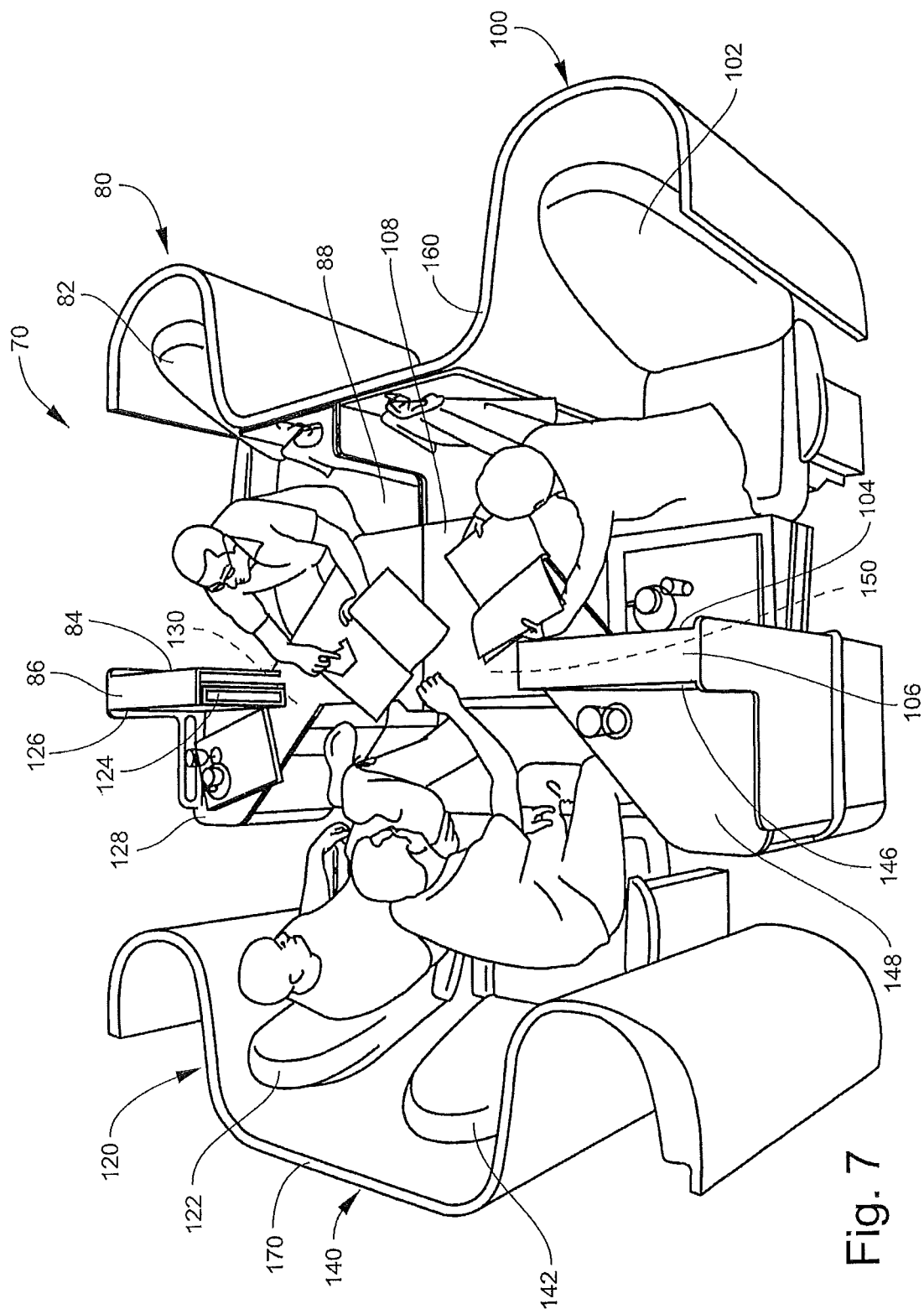
FIG. 7 is an overhead perspective view of an alternative configuration wherein two pairs of oppositely facing passengers are provided with a suites that permits visual access for ease of communication.
Figure 8:
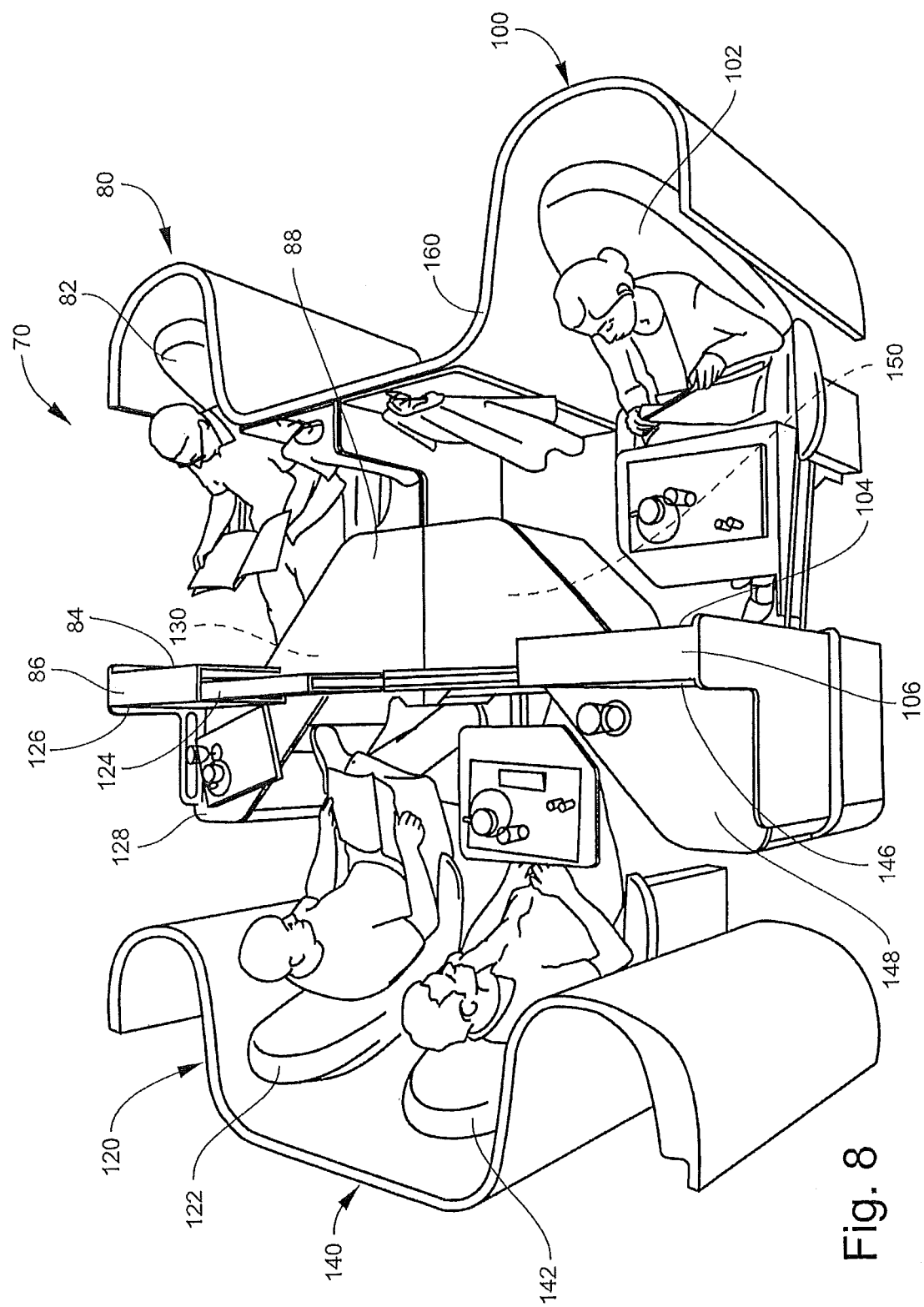
FIG. 8 is an overhead perspective view perpendicular to the view of FIG. 7 showing the seating configuration of FIG. 7.
Figure 9:
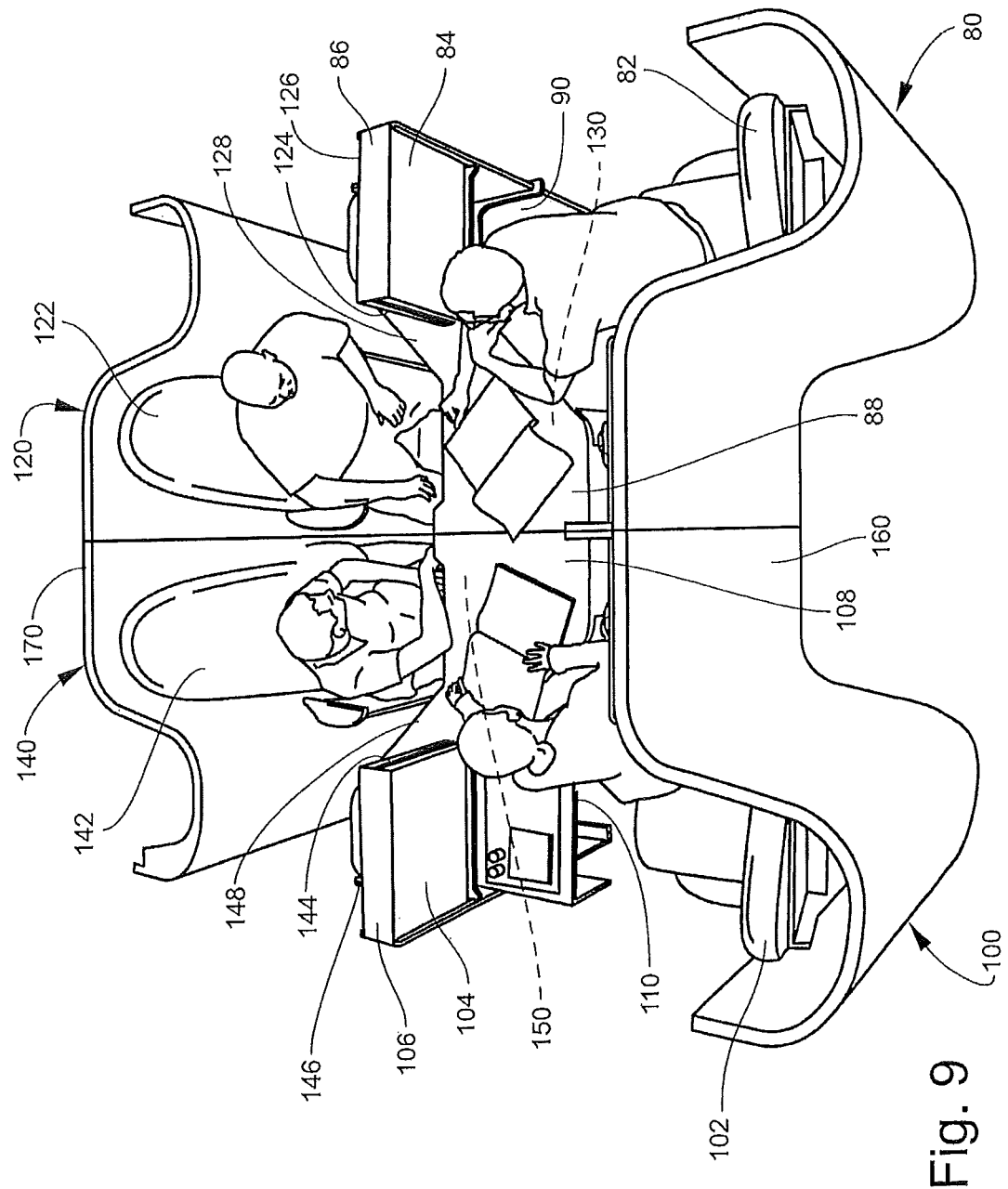
FIG. 9 is an overhead perspective view of the suite of FIG. 7 with video monitors deployed to permit viewing by the left hand seat occupants.

As is best shown in FIGS. 7 and 8, the configurations described above permit the four passengers seated in seats 82, 102, 122, and 142, respectively, to converse with unimpeded visual contact when desired by stowing the video monitors 124 and 144 in the cabinets 126 and 146. In this manner the video monitors 124 and 144 are out of the line of sight between the passengers.

Figure 11:
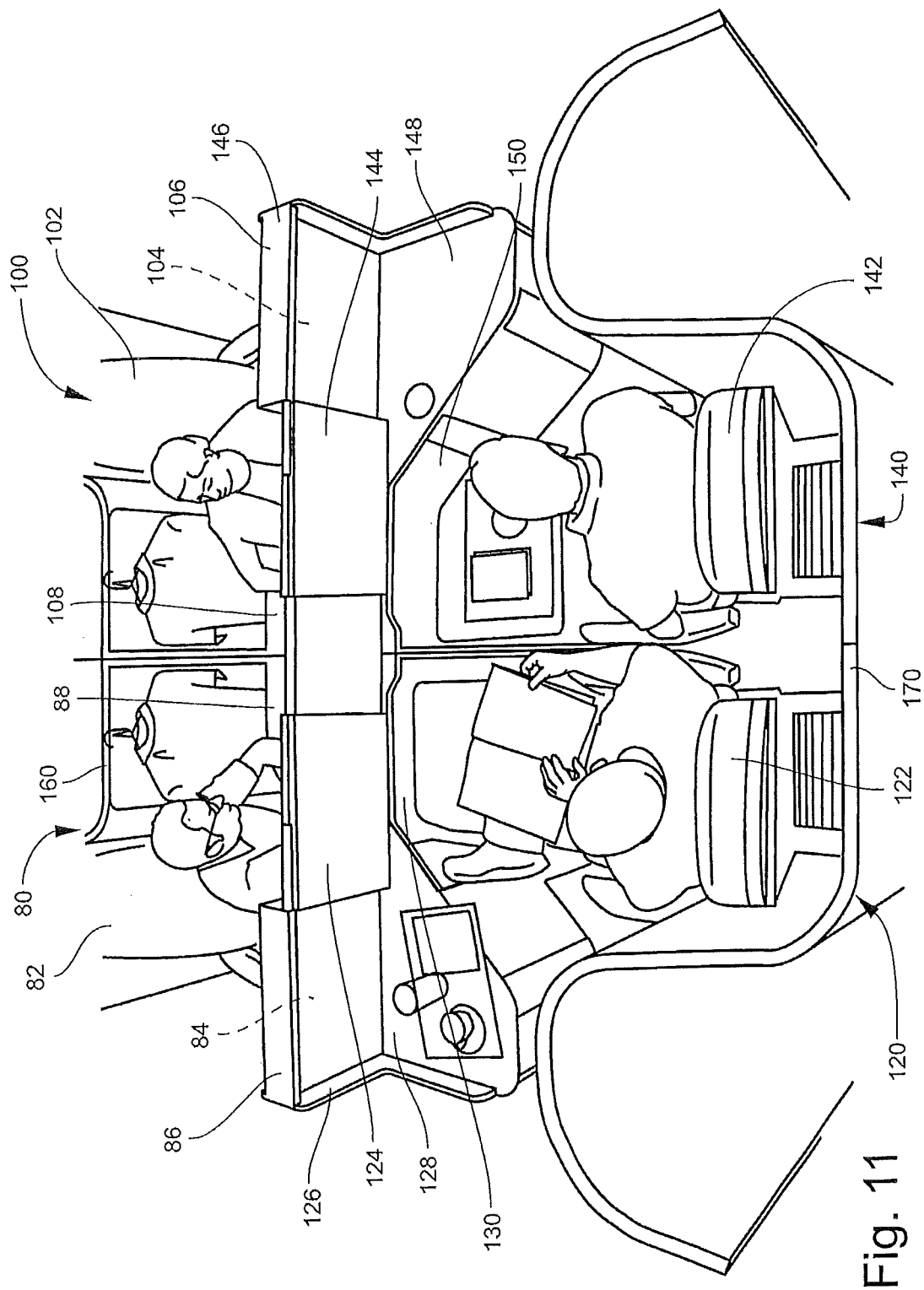
FIG. 11 is an overhead perspective view from a reverse direction relative to FIG. 10.

Conversely, if privacy is desired, the video monitors 124 and 144 are deployed to the position directly in front of the seats 122 and 142. As best shown in FIGS. 10 and 11, the deployed video monitors 124, 144 form vertical privacy panels that block visual contact between the occupants of seats 122, 142 with the occupants of seats 82, 102. As shown, an insert 172 may be positioned between the deployed monitors 124, 144, if needed, to fully block the space between the seats 122, 142 and 82, 102.

Note particularly the nestable configuration of the partition walls 160 and 170. Due to the symmetry provided by the shape of these elements, the configuration described above can be repeated indefinitely along the longitudinal axis of a passenger cabin by the placement of successive partition walls along its length. For example, as illustrated in FIG. 10, two seats with the same spacing as seats 122, 142 can be placed in the concavity in the partition wall 160 between seats 82 and 102. In the same manner, two seats with the same spacing as seats 82 and 102 can be placed in the two spaced apart concavities that contain the seats 82 and 102.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger suite seating arrangement, comprising:
    (a) first and second passenger suites positioned side-by-side and including respective first and second seats,
    (b) first and second video monitors respectively positioned in a viewing position directly forward of the first seat and second seats;
    (c) third and fourth passenger suites positioned side-by-side, including respective third and fourth seats, and facing the first and second passenger suites;
    (d) respective third and fourth video monitors positioned and adapted to slide in a linear path between a stowed position laterally offset from a viewing position and a deployed viewing position forward of the third and fourth seats, wherein in the deployed viewing position the third and fourth video monitors block visual contact between occupants of the first and second seats and the occupants of the third and fourth seats; and
    (e) first and second upright support structures positioned in viewing position directly in front of the first and second seats and supporting the respective first and second video monitors, wherein the first and second upright support structures include first and second cabinets that house the third and fourth video monitors in their respective stowed positions laterally offset from the viewing positions.

2. The seating arrangement of claim 1, wherein the third and fourth video monitors move between the stowed and deployed positions perpendicular to a viewing angle of a passenger seated in the respective third and fourth seats, and wherein the first and second passenger suites share a desk positioned therebetween.

3. The seating arrangement of claim 1, wherein the first and second seats are spaced apart by a lateral space that approximates a lateral space occupied by the third and fourth seats.

4. The seating arrangement of claim 1, and including a first partition wall having first and second spaced apart concavities for containing the respective first and second seats in spaced-part relation to each other, and a second partition wall having a single central concavity facing first partition wall and containing the third and fourth seats.

5. The seating arrangement of claim 4, wherein the first and second partition walls have the same overall shape.

6. The seating arrangement of claim 1, wherein each of the first, second, third and fourth passenger suites include a tray table deployable from a position directly forward and spaced apart from the respective seat to a position directly forward and over the respective seat.

7. The seating arrangement of claim 1, wherein the first, second, third and fourth seats are lie-flat adjustable seats.

8. The seating arrangement of claim 1, wherein the first and second passenger suites are divided by a shared console topped with a desk shared by the first and second passenger suites, the desk supporting the first and second video monitors thereon.

9. The seating arrangement of claim 1, wherein the first and second video monitors are fixed in their respective viewing positions.

10. The seating arrangement of claim 1, wherein the partition walls positioned behind the first and second seats are sinusoidal shaped.

11. The seating arrangement of claim 1, wherein a console is laterally positioned between the first and second seats and the third and fourth seats, and includes first and second distally-positioned foot wells for use by occupants of respective first and second seats, and centrally-positioned third and fourth foot wells for use by occupants of respective third and fourth seats.

12. A passenger suite seating arrangement, comprising:
    (a) first and second passenger suites positioned side-by-side and including respective first and second seats,
    (b) first and second video monitors respectively positioned in a viewing position directly forward of the first seat and second seats;
    (c) third and fourth passenger suites positioned side-by-side, including respective third and fourth seats, and facing the first and second passenger suites, the first and second seats being spaced apart by a lateral space that approximates a lateral space occupied by the third and fourth seats;
    (d) respective third and fourth video monitors positioned and adapted to slide in a linear path between a stowed position laterally offset from a viewing position and a deployed viewing position forward of the third and fourth seats, wherein in the deployed viewing position the third and fourth video monitors block visual contact between occupants of the first and second seats and occupants of the third and fourth seats, and wherein the third and fourth video monitors move between the stowed and deployed positions perpendicular to a viewing angle of a passenger seated in the respective third and fourth seats; and
    (e) a shared console topped with a desk shared by the first and second passenger suites, the desk supporting the first and second video monitors thereon; and
    (f) first and second upright support structures positioned in viewing position directly in front of the first and second seats and supporting the respective first and second video monitors, wherein the first and second upright support structures include first and second cabinets that house the third and fourth video monitors in their respective stowed positions laterally offset from the viewing positions.

13. The seating arrangement of claim 12, and including a first partition wall having first and second spaced apart concavities for containing the respective first and second seats in spaced-part relation to each other, and a second partition wall having a single central concavity facing first partition wall and containing the third and fourth seats.

14. The seating arrangement of claim 13, wherein the first and second partition walls have the same overall shape.

15. The seating arrangement of claim 12, wherein each of the first, second, third and fourth passenger suites include a tray table deployable from a position directly forward and spaced apart from the respective seat to a position directly forward and over the respective seat.

\* \* \* \* \*